United States Patent [19]
Ahlen

[11] 4,056,019
[45] Nov. 1, 1977

[54] TORQUE CONVERTER TRANSMISSION AND VALVE ARRANGEMENT THEREFOR

[75] Inventor: Karl Gustav Ahlen, Stockholm, Sweden

[73] Assignee: S.R.M. Hydromekanik Aktiebolag, Stockholm-Vallingby, Sweden

[21] Appl. No.: 729,421

[22] Filed: Oct. 4, 1976

Related U.S. Application Data

[63] Continuation-in-part of Ser. No. 695,043, June 11, 1976, abandoned, which is a continuation of Ser. No. 549,448, Feb. 12, 1975, abandoned.

[30] Foreign Application Priority Data

Feb. 14, 1974 United Kingdom ............... 6856/74
Dec. 18, 1974 United Kingdom ............. 54770/74

[51] Int. Cl.² .............................................. F16H 47/04
[52] U.S. Cl. ........................................ 74/677; 74/688; 60/347; 137/625.14
[58] Field of Search ............. 137/625.14, 625.15, 137/625.18; 74/677, 688, 732; 60/347, 361, 362

[56] References Cited

U.S. PATENT DOCUMENTS

| | | | |
|---|---|---|---|
| 3,294,120 | 12/1966 | Ruchser | 137/596.16 X |
| 3,452,781 | 7/1969 | Napolitano | 137/596.16 X |
| 3,831,463 | 8/1974 | Ahlen | 74/732 |
| 3,839,864 | 10/1974 | Ahlen | 60/349 |

Primary Examiner—Edgar W. Geoghegan
Attorney, Agent, or Firm—Larson, Taylor and Hinds

[57] ABSTRACT

For a torque converter transmission, a valve arranged to control the flow of fluid therein. Flow between five axially spaced apart ports, and in particular from a central port to a pair of adjacent control ports and from the control ports to respective adjacent vent ports is controlled by axially spaced apart disc valve elements operatively associated with one or more axially movable elongated members, each disc element being axially movable against a mating valve seat. The valve may control flow to the working chamber of the torque converter or serve other functions such as controlling the mode of operation of the torque converter.

46 Claims, 12 Drawing Figures

TORQUE CONVERTER TRANSMISSION AND VALVE ARRANGEMENT THEREFOR

RELATED APPLICATION

This application is a continuation-in-part of my co-pending application Ser. No. 695,043, filed June 11, 1976, now abandoned which is in turn a continuation of my application Ser. No. 549,448, filed Feb. 12, 1975, now abandoned. This invention relates to a pressure fluid distribution valve especially intended for use with hydrodynamic torque converter transmissions, in which inversion of the direction of flow through the working chamber is utilized for establishing different types of drive.

One of the problems in connection with hydrodynamic torque converter transmissions concerns the drop in pressure at different points in the circulation of fluid from the feeder fluid pump through the valve system, the rotating seals and other torque converter seals, the maximum pressure valves and through a heat exchanger and back to the feeder fluid pump. In existing designs such pressure drops have been excessive especially with respect to two places and especially at high primary speeds, and that is through the valve system and through the maximum pressure valves. The pressure drops are excessive through the maximum pressure valves because the latter have to guarantee a minimum pressure at low primary speeds, and they have to be made in such a way that they are fluid tight, and also through the valve system, because normally many channels are needed, in the connections of which the fluid flow has to make many turns to traverse the valve system.

A further difficulty is that with the valve systems and the maximum pressure valves hitherto utilized, it has been necessary to have a very accurate cleaning system to avoid any particles flowing with the oil either preventing the maximum pressure valves from closing or causing the valve system to stick in one position or another.

An object of this invention is to provide a structure of a valve system which, while still being simple to manufacture, will radically reduce the pressure drops in the distribution valve system, and if the system contains maximum pressure valves the structure will also make the sensitivity with respect to quantity of flow through the valve as low as possible, while at the same time the valve is for practical purposes insensitive to hard particles which may exist in the oil flow.

A particular purpose of this valve is also to be able to reverse the direction of flow through, for instance, a torque converter, without reducing the quantity of flow, which is a requirement for instance, when using reversal of the flow to connect hydraulic drive in one direction and direct drive in another, and where with direct drive hydraulic braking is used.

Another purpose of this invention is to provide a single basic valve structure having the above advantages, and susceptible, with slight modifications to be adapted for different operating conditions and other functions within a transmission of the type described.

According to the invention, in a valve arrangement primarily for use within a fluid transmission, for example, for controlling the flow of fluid in a hydrodynamic torque converter transmission, all the valve seats are co-axially arranged with respect to one or more elongated axially extending members and have associated co-axial valve discs which move axially into cooperation with mating valve seats, and axial thrust elements which actuate at least some of the valve discs in response to a manual or servo motor setting of the thrust elements.

The invention will be hereinafter more fully described by way of example with reference to the embodiments thereof illustrated in the accompanying drawings in which:

FIG. 1 shows a longitudinal section of a hydrodynamic torque converter transmission adapted to use the torque converter as a retarder to convert mechanical energy into heat and with a releasable pump arrangement according to, for instance, our U.S. Pat. No. 3,831,463.

FIGS. 2a and 2b are enlarged portions of FIG. 2, showing the valve in the position for hydraulic drive and direct drive, respectively.

Figure 1:
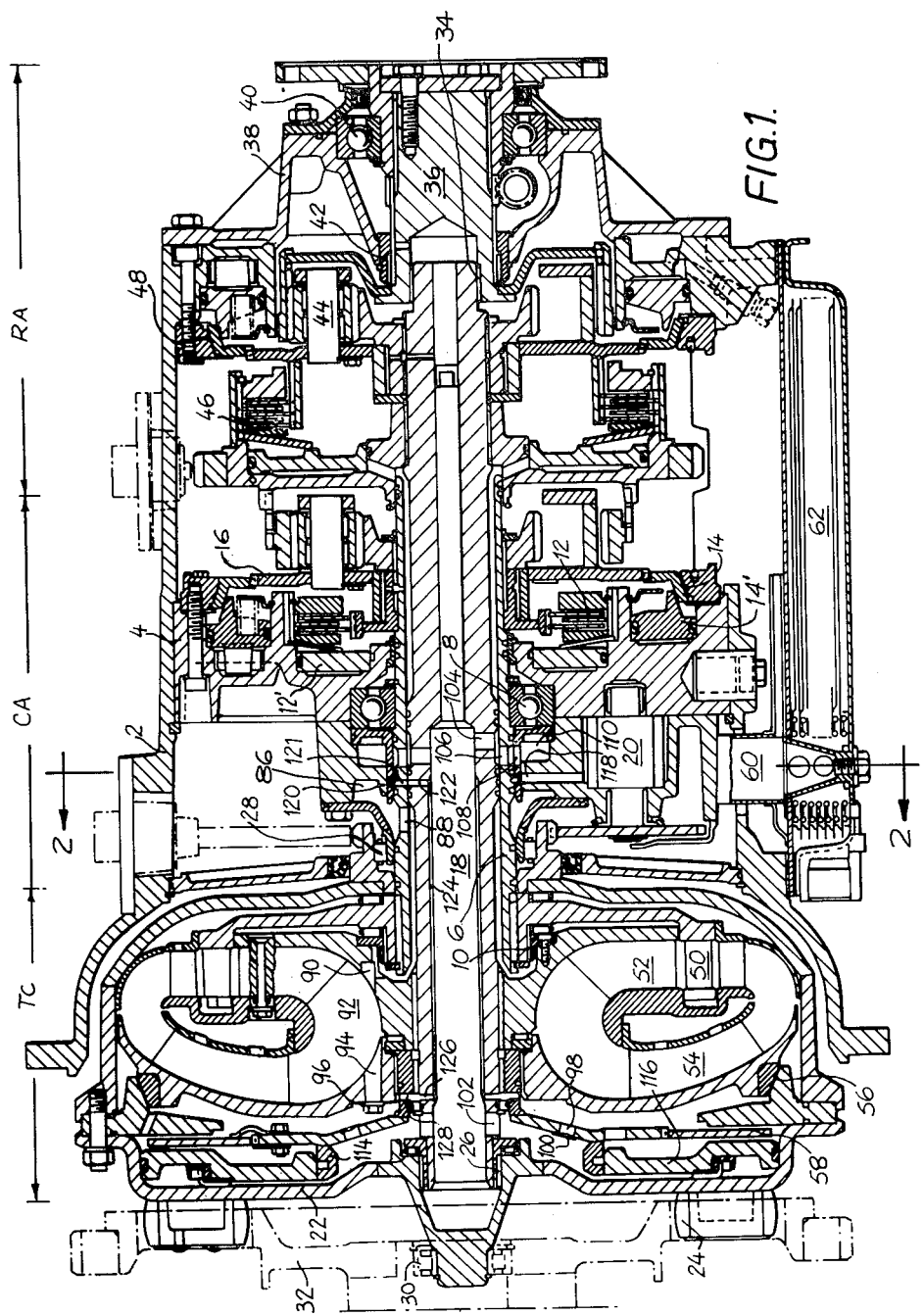

The transmission of FIG. 1 may be regarded as an assembly of three main parts, namely, a torque converter TC of the type having a rotatable casing 22, a central assembly CA of operatively associated components and a rear assembly RA of operatively associated components.

The associated components of the central assembly CA are carried in a stationary member 4 which is mounted in a stationary housing 2 and through which the torque converter guide vane shaft 6 extends and is journalled in a bearing 8.

The central stationary member 4 also carries a guide vane shaft brake 12 and a planet gear carrier 16 for a planet gear interposed between the guide vane shaft 6 and a turbine shaft 18, and a brake 14 for the planet gear carrier 16. Brake 12 is connected by movement to the right of annular piston 12' under the action of pressurized fluid delivered to the left of piston 12'. Brake 14 is actuated by movement to the right of annular piston 14' under the action of pressurized fluid delivered to the left side of said annular piston 14. The fluid passageways from the source of pressurized fluid to the pistons 12 and 14 are not shown although a valve constructed in accordance with the present invention for controlling said flow will be described below.

A feeder fluid gear pump 20 comprises two externally meshing gears 21, 23 (FIG. 2) of which one is driven through a gear on the rotatable casing 22 directly from a flywheel 32 through rubber cushions 24.

The turbine shaft 18 is journalled in the rotatable casing 22 through a plain bearing 26. The rotatable casing 22 is, at its rear end, journalled in the central stationary member 4 in a radial bearing 28 and at its front end in the flywheel 32 through a bearing 30. The turbine shaft 18 is, at its rear end, journalled through a plain bearing 34 in an output shaft 36 which, in turn, is journalled in a rear cover 38 by a ball bearing 40 and a radial bearing 42.

Between the turbine shaft 18 and the output shaft 36 there is a reverse planet gear arrangement having a planet gear carrier 44 giving a direct connection between the shafts 18 and 36 when a clutch 46 is engaged and reversing the direction of rotation of the output shaft 36 when a brake 48 is engaged and the clutch 46 is released.

In the rotatable casing 22, a guide vane ring 50 is mounted on the guide vane shaft 6 and on the turbine shaft 18 a turbine member 52 is mounted. The rotatable casing 22 also contains a pump member 54, connectable or releasable from the rotatable casing through a clutch 56. A lock-up clutch arrangement 58 is also included for connecting the turbine shaft 18 directly to the rotatable casing 22.

Figure 2:
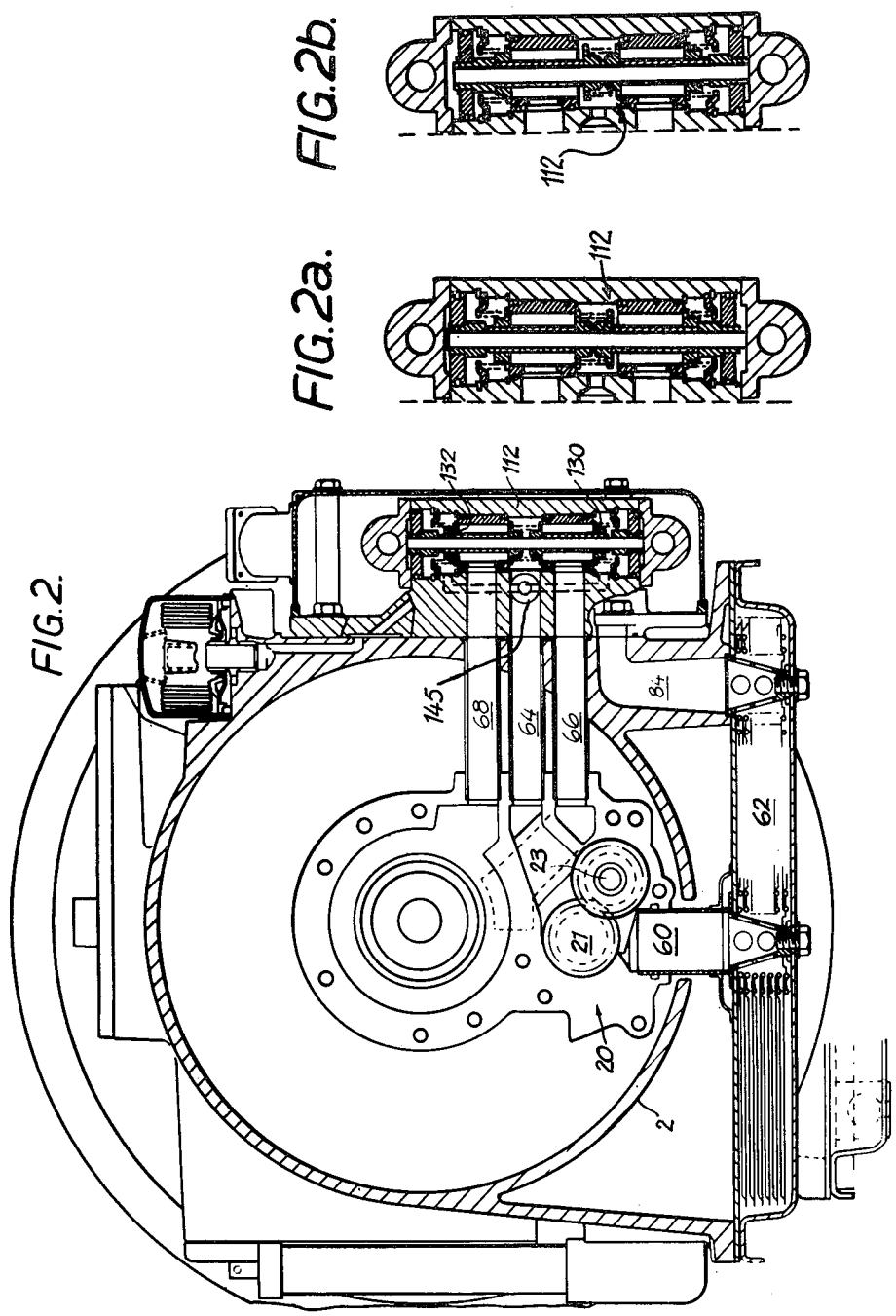
FIG. 2 is a transverse sectional view taken on line 2—2 of FIG. 1, in which, in conjunction with FIG. 1, the operative flow circulation can be seen together with a control valve for such circulation.

FIG. 2 is a cross-section through the hydrodynamic mechanical transmission of FIG. 1 taken along the line 2—2 in the region of the central member 4. Together with FIG. 1 it illustrates how the feed pressure pump 20 delivers liquid under pressure to the valve system shown schematically in FIG. 2. This valve system is arranged on the outside of the non-rotatable transmission housing 2. The feed pressure pump 20 delivers liquid under pressure through a feed pressure conduit 64 to one or the other of two connecting conduits 66 and 68 which can be connected alternatively to the feed pressure conduit 64 by way of a valve 112 while the remaining connecting conduit 68 or 66 returns the liquid under pressure, namely oil, after it has passed through the torque converter blade system.

The feed pressure conduit 64 contains a servo-operated restrictor valve 145 which ensures that the liquid is at a higher pressure in front of said valve than behind it. In this way, a higher pressure is available for use in the actuating servos of the brakes and clutches in order to obtain a sufficiently high torque transmission capacity while pressure liquid at a lower pressure is available for the remainder of the hydraulic system. The servo-operated restrictor valve 145 will be described in more detail later with reference to FIG. 6. It comes into operation whenever the double rotation brake 14 is in position. The control system also comprises electrohydraulic valves which control the flow of liquid under pressure to the actuating servos of the brakes and clutches. Release of the brakes and clutches is accelerated by valves which open relatively large outlets from the actuating servos as soon as release of pressure liquid from them is initiated by the electrohydraulic valves.

FIG. 2 also shows in the non-rotatable transmission housing 2 a return channel 84 from the valve system to the heat exchanger 62 and a pipe connection 60 from the outlet end of the heat exchanger to the feed pressure pump 20. The path between the connecting conduits 66 and 68 by way of the hydrodynamic torque converter extends through the central member 4 into a chamber 86 and through radial bores 88 in the guide wheel spindle 6 between said spindle and the turbine shaft 18 and through axially extending bores 90 in the turbine wheel to the converter chamber 92 and blade rings 50, 52 and 54 and from there through axially-directed bores 94 with maximum pressure valves 96 attached thereto, a bore 98 within the clutch disc of the direct clutch 58 and a non-return valve 100, through a radial bore 102 and the central bore 19 of the turbine shaft 18 and through radial bores 104, 106 and 108 to return to a chamber 110 within the central member 4 in which the conduit 66 is connected to the chamber 86 mentioned above and conduit 68 is connected to chamber 110.

The pressure fluid flow in the above described direction when the hydrodynamic torque converter is switched to hydraulic drive and valve 112 is accordingly in the position shown in FIG. 2a. In this position, the pump member 54 is coupled to the converter housing 22 by the clutch 56 under the force produced by the pressure difference at the maximum pressure valve 96. In direct drive, on the other hand, valve 112 assumes the position shown in FIG. 2b, in which the flow of pressure fluid is reversed between the connecting conduits 66 and 68 so that the fluid enters the converter chamber through conduit 68. Instead of passing through the non-return valve 100, however, the pressure fluid entering through the radial bore 102 passes through a maximum pressure valve 114 in the clutch disc of the direct clutch 56 and as a result of the pressure drop, it then acts on the servo piston 116 of the direct clutch 58 so that said clutch is engaged. After passing through the maximum pressure valve 114, the pressure fluid continues its flow between the clutch surfaces of the free wheel overrunning clutch 56, to release the pump member 54, leaves the converter chamber 92 through the axially directed bores 90 and returns from there along the path described above to the conduit 66 and the valve 112. In both cases the return flow is through valve 112 and from there back through the channel 84 in the non-rotatable housing 2 to the heat exchanger 62 and then through the heat exchanger 62 back to the feed pressure pump by way of the channel 60.

When the valve 112 is in its mid position, the feed pressure conduit 64 is connected neither to conduit 66 nor to conduit 68. Instead, it is directly connected to the heat exchanger 62 by way of a maximum pressure valve which together with the restrictor valve 145 forms a valve unit. FIG. 1 shows a channel 118 which connects the feed pressure pump 20 to the working chamber 92 by way of radial bores 120, 121 and 122 and an axially extending channel 124 in the turbine shaft as well as through radial bores 126 and 128 in said shaft. The limited quantity of pressure fluid which enters the chamber 92 along this path leaves chamber 92 through the non-return valve 100 which in this case operates as low-pressure difference-maximum pressure valve, and it flows to the spill duct 84 through the conduit 66 and a low-pressure difference-maximum pressure valve 130 contained in the valve 112. A corresponding maximum pressure valve 132 connected to conduit 68 is designed for a relatively high opening pressure in order to ensure a sufficiently high pressure in the converter chamber 22 for hydraulic braking. This valve is closed in the neutral position.

Figure 3:
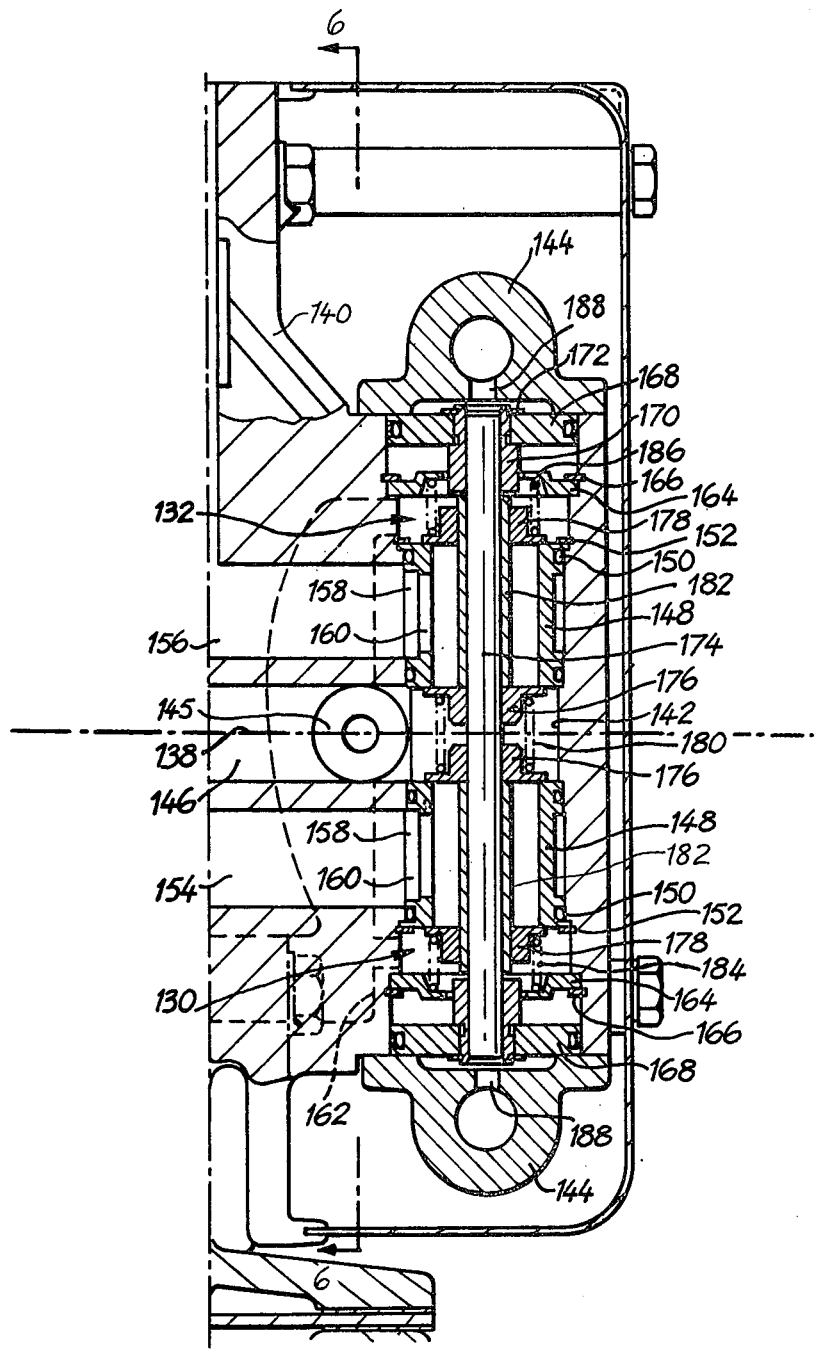
FIG. 3 is an enlarged approximately full-size sectional view of the valve of FIG. 2.

The construction of the valve 112 which is combined with the maximum pressure valves 130 and 132 can be seen in the enlarged sectional view of FIG. 3.

The valve, which is substantially symmetrical with respect to a transverse plane 138, comprises a housing 140 with a valve bore 142 extending right through it. This bore 142 has a plurality of steps and it ends are closed by initial valve housings 144. An inlet aperture 146 connected to the feed pressure conduit 64 opens into the valve bore 142 at the axial centre thereof. Sleeves 148 are inserted in the valve bore 142 on both sides of this opening and sealed by means of O-rings 150 and fixed in position by snap rings 152. Inlet apertures 154, 156 to which the conduits 66 and 68 are connected open into the valve bore 142 at axial distances apart on both sides of the inlet aperture 146 by way of annular grooves 158 and radial bores 160 in the sleeves 148. Outside the snap rings 152, a spill duct 162 which is situated in the valve housing 140 and communicates with the spill duct 84 (FIG. 2) in the non-rotatable transmission housing 2 opens into the valve bore before the valve bore widens out into the last shoulder. Disc-shaped spring abutments 164 inserted in the outermost sections of the valve bore 142 bear against these shoulders and are kept in position by snap rings 166.

Each of the outermost sections of the valve bore 142 is sealed by an operating piston 168 which is displaceable inside it and seated on a sleeve 170 with which is it axially connected by a snap ring 172. The two sleeves 170 are mounted to be axially displaceable on a guide spindle 174 which prevents tilting of the valve pistons 168.

The ends of the sleeves 148 form valve seats for inner valve disc or plate 176 in one case and an outer valve disc or plate 178 in the other. The inner valve plates 176 are mounted to be axially displaceable directly on the guide spindle 174 and are biased by a helical pressure spring 180 arranged between them to move into their closing position towards their valve seats on the sleeves 148. The outer valve plates 178, on the other hand, are mounted to be displaceable each on a sleeve 182 which in turn is displaceable on the guide spindle 174 and which extends between the associated sleeve 170 and the associated inner valve plate 176 with a certain axial clearance. Furthermore, the outer valve plates 178 are biased against their seats on the sleeves 148 by helical pressure springs 184 which bear against the annular spring abutments 164.

The initial valve housings 144 contain electromagnetically operated initial valves (not shown) by which control pressure fluid can be conducted alternatively to the external surfaces of the valve pistons 168 through axial bores 188 in the initial valve housings 144. The valve described above operates as follows.

If, for example, the transmission shown in FIG. 1 is to be switched to hydraulic drive, i.e. conduit 66 is required to be connected to the feed pressure conduit 64 and conduit 68 is to be opened to the spill duct 84, the lower servo valve is operated. Pressure fluid is thereby passed through the axial bore 188 to the underside of the lower valve piston 168 so that piston 168 is raised together with the sleeve 170. After a short free travel, the sleeve 170 engages the lower sleeve 182 and carries it upwards, whereby the lower inner valve plate 176 is lifted from its seat against the pressure of the helical pressure spring 180, and pressure fluid is then free to flow from the feed pressure conduit 64 to conduit 66. The lower sleeve 170 finally encounters the lower outer valve plate 178 and presses it firmly against its valve seat under the action of the hydraulic pressure on the underside of the lower piston 168.

The lifting of the lower inner valve plate 176 increases the tension on the helical pressure spring 180 and thereby increases the closing pressure for the upper inner valve plate 176 which in addition is already under the pressure in the feed pressure conduit 64 urging it in the closing direction. The pressure fluid returning from the hydrodynamic torque converter through conduit 68 therefore cannot lift the lower inner valve plate 176 from its seat and instead it raises the upper outer valve plate 178 from its seat and thereby opens the path to the spill duct 162 and from there to the spill duct 84 and into the heat exchanger 62 which forms part of the transmission sump; from there it is sucked into the feed pressure pump 20 through the pipe connection 60 and returned to the valve through the feed pressure conduit 64.

If, on the other hand, the converter is required to be switched to direct drive, that is to say, the feed pressure conduit 64 is required to be connected to conduit 68 while conduit 66 is required to be connected to the spill duct 84, then the upper servo valve is operated instead of the lower servo valve and the operations which then take place can be mirror image with respect to the symmetrical axis 138 of those which take place when the hydraulic drive is switched on in valve 112.

It is obvious that the two outer valve plates 178 constitute the above mentioned low-pressure difference-maximum pressure valves 130 and 132 due to their being biased by the helical pressure springs 184 and 186. The pressure spring 186 on the outer valve plate 178 is designed to be substantially more powerful than the pressure spring 184 and thus produces the high opening pressure already mentioned above to ensure sufficiently high pressure in the converter chamber for hydraulic braking.

Figure 4:
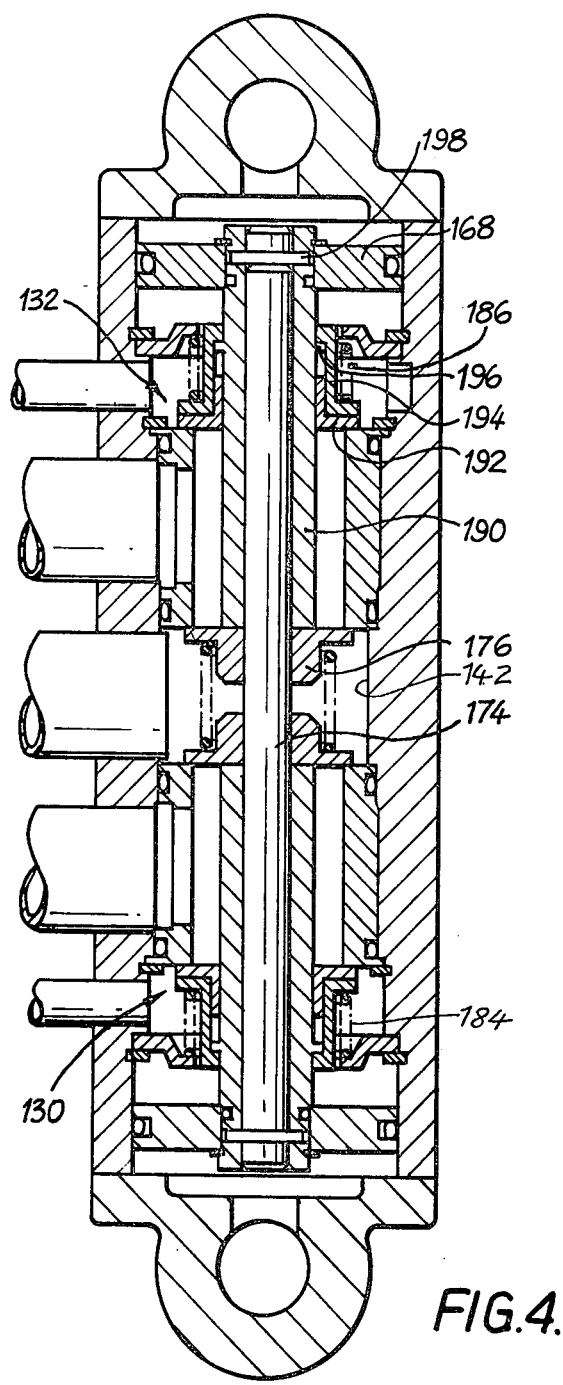
FIG. 4 is a sectional view similar to FIG. 3 but showing a modified embodiment of the valve of FIG. 2.

FIG. 4 shows a modified embodiment of the valve 112 combined with the maximum pressure valves 130 and 132 in which the outer valve plates are positively relieved by the closing pressure of the helical pressure springs 184 and 186, and the spill flow is required to be conducted from the converter chamber to the spill duct 84 when the valve is operated in the one or other direction.

In the embodiment shown in FIG. 4, in which all the parts similar to those of the embodiment shown in FIG. 3 have the same reference numerals as in FIG. 3 the valve bore 142 is slightly elongated at both ends and the valve pistons 168 are seated on sleeves 190 which extend towards the middle of the valve as far as the inner valve plates 176. The sleeves 190 are provided in place of the sleeves 182 in the valve previously described. They support outer valve plates 192 which are L-shaped in cross-section, and sleeves 194 which are Z-shaped in cross-section slide on the axial portion of the L-shaped valve plates 192. The helical pressure spring 184 or 186, respectively, acts on the external flange of the Z-shaped sleeve 194 urging it to move into the closing position of the valve plate 192.

The other end of each of the Z-shaped sleeves 194 engages on its inner surface with the flange formed by a ridge 196 on the sleeve 190. Furthermore, transverse pins 198 are seated in the sleeves 190 so that they lie within the pistons 168 and in front of the ends of the guide spindle 174.

When one of the servo valves is opened in the valve system described above so that pressure acts on the external surface of the corresponding operating piston 168, the associated sleeve 190 lifts the corresponding inner valve plate 176 from its seat. At the same time, the transverse pin 198 seated within the operated piston engages the guide rod 174 which in turn presses on the transverse pin 198 in the opposite piston 168 and thereby moves the opposite sleeves 190 with said pison 168. The external flange formed by ridge 196 on this sleeve 190 then engages the corresponding sleeve 194 of Z-shaped cross-section and compresses the helical pressure spring 184 or 186, at the same time relieving the outer valve plate 192. This valve plate 192 can thereby be lifted from its seat under the pressure of the fluid returning from the converter chamber.

Figure 5:
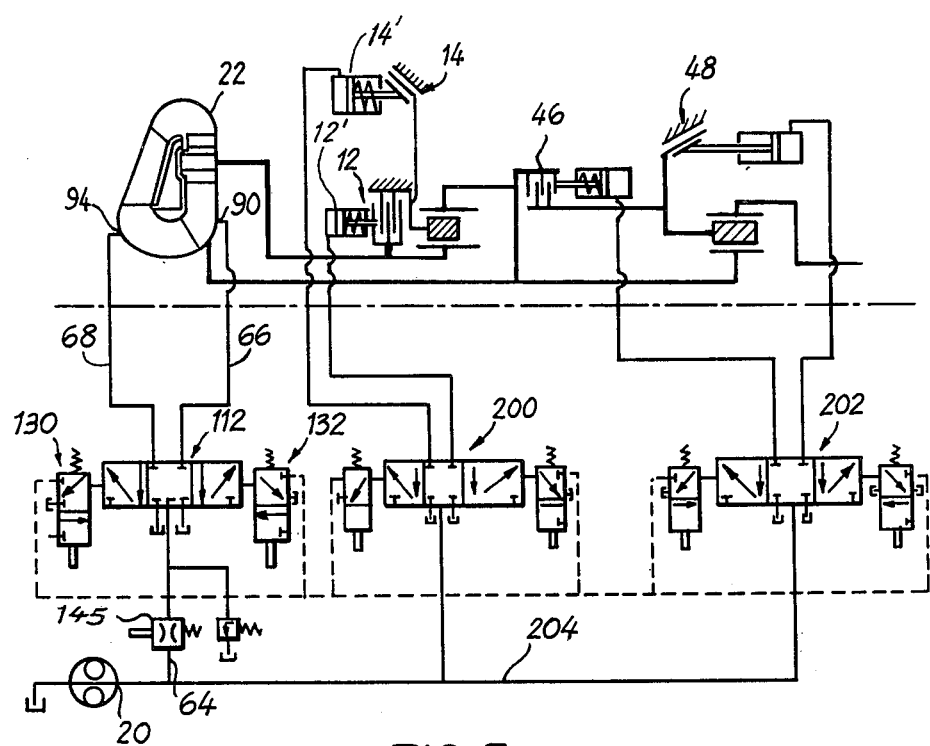
FIG. 5 is a schematic representation of the transmission of FIG. 1 showing the torque converter working chamber and hydraulically operated servos and a valve arrangement for controlling them.

FIG. 5 again illustrates the operation of the valve described above in a hydrodynamic-mechanical transmission of FIG. 1 in which the essential components, namely the converter chamber 22, the guide wheel brake 12 for simple rotation of the converter, the epicyclic brake 14 for double rotation of the converter, the forward clutch 46 and the epicyclic brake 48 of the reversing transmission are only shown diagrammatically. FIG. 5 shows also a hydraulic circuit with feed pressure pump 20, feed pressure conduit 64, valve 112, conduits 66, 68 to the torque converter and electromagnetic maximum pressure valves 130 and 132. In FIG. 5, the full lines represent pipe lines for conveying fluid whereas the dotted lines represent electrical connections to the electromagnetic valves.

Another valve 200 is provided for controlling the flow of fluid to pistons 12' and 14' to control brakes 12 and 14 for simple rotation drive or double rotation drive, and another such valve 202 serves for alternatively connecting the forward clutch 46 or reversing brake 48 on the reversing transmission. The valves 200 and 202 are basically similar to valve 112.

A selectively operated restrictor valve 145 is arranged in conduit 64, as already mentioned above, and comes into operation for double rotation drive, thereby mantaining a high pressure in the feed pressure conduit 204 leading to the valves 200 and 202. This ensures that in the event of double rotation, the brake 14 as well as the clutch 46 and brake 48 can take up the execptionally high torque which occurs on double rotation.

All the servo halves of valves 112, 200 and 202, on the other hand, may be supplied with pressure fluid under reduced pressure behind the restrictor valve 145, so that any pressure losses due to leakage of the operating pistons of the valves are kept as small as possible.

It has already been mentioned earlier that when valve 112 is in its mid position, a maximum pressure valve 145 relieves the feed pressure conduit 64 directly to the sump in the converter housing.

Figure 6:
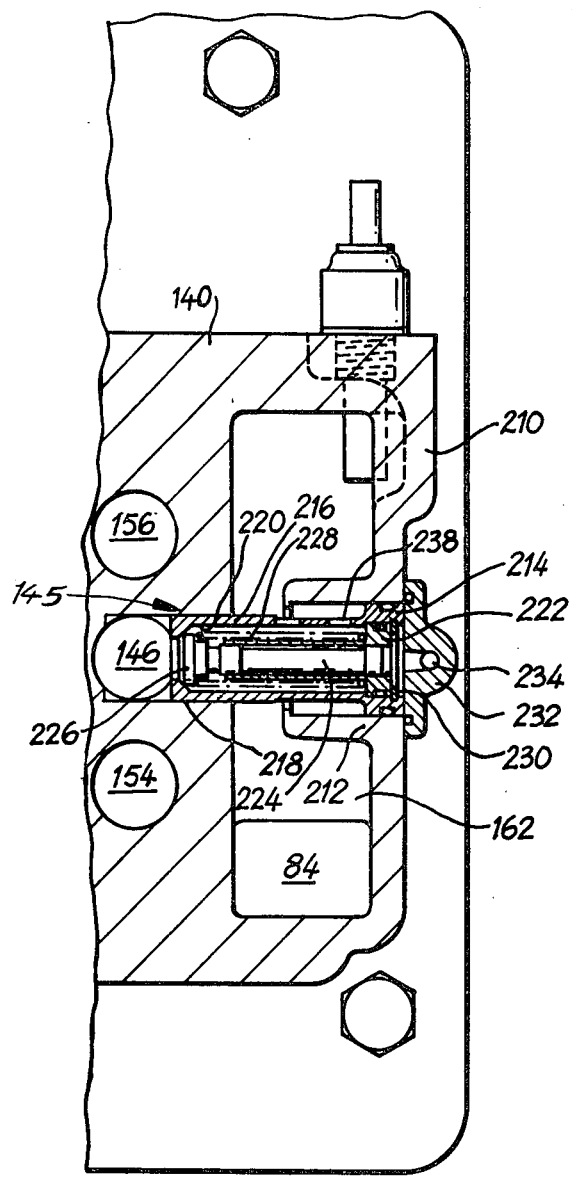
FIG. 6 is a longitudinal sectional view taken along line 6—6 of FIG. 3 through the switchable restrictor and maximum pressure valve in the pressure fluid conduit of FIG. 2.

FIG. 6 shows an embodiment in which this maximum pressure valve is combined with the selectively operated restrictor valve 145 inside the valve housing 140 of the valve 112.

The valve housing 140 through which the inlet ducts 146, 154 and 156 extend contains the spill duct 162 already mentioned above, which is situated laterally to said inlet ducts and to which the spill duct 84 in the transmission housing 2 is connected. A cylinder 212 for the piston 214 of a restrictor valve body 216 is displaceably sealed into the external wall 210 of the housing 140, which wall also delimits the spill duct 162. The free end of the restrictor valve body 216 extends into a transverse bore 218 leading to the inlet duct 146. The bore 220 of the valve body 216 is tapered at its free end to form a valve seat and contains a guide sleeve 222 which widens out at its outer end to form a piston. A valve rod 224 is displaceably guided inside the guide sleeve 222. The head 226 of the valve rod 224 is biased against the valve seat inside the valve body 216 by a helical pressure spring 228. The sleeve 222 is secured in the valve body 216 by a snap ring 230. The cylinder 212 is closed on the outside by a valve corner 232 and it contains a channel 234 for the supply of pressure fluid into the interior of the valve body 216 and to the rear surface of the piston 214.

The valve body 226 together with the seat in the valve body 216 forms a maximum pressure valve which is normally closed. If, with the valve in this closed position, fluid is forced under pressure through the duct 234 to the rear surface of the piston 214 and into the interior of the valve body 216, the valve body 216 is pushed forwards in the transverse bore 218 and closes most of the inlet duct 146 which is therefore restricted like the restrictor valve 145 described above. When the duct 234 is evacuated, the valve body 216 is returned to its starting position by the pressure in the duct 146. If the pressure of 146 exceeds the closing force of the spring 228, the valve head 226 is raised from its seat and evacuates the feed pressure duct 146 into the spill duct 162 through transverse bores 236 and 238 in the valve body 216.

The valve arrangement of the present invention has been described as being particularly suitable for use with a torque converter having a releasable torque transmitting member. There has been described herein a torque converter having a releasable pump part. Other releasable torque converters are also particularly suited for use with the present invention, for example a torque converter having a releasable turbine part as shown and described for example in my previous U.S. Pat. No. 3,839,864.

An advantage of the present invention is that the basic structure thereof, as shown and described herein, is capable of being modified and hence adapted for different operating conditions and for performing different functions. For example, although it is desirable to utilize resilient means for urging the two inner valve disc 176 into engagment with their seats, such spring means can be deleted and the valve will still operate in the intended manner. The springs serve in the nature of a safety device and assist when starting up the fluid flow. However, in normal operation the input pressure will always tend to urge these valve discs against their respective seats. Another area where the valve of the present invention is quite diversified is in the structure concerning the two outer valve discs 178. As shown in FIG. 3, the valve discs 178 are always urged by spring means towards their respective valve seats. In FIG. 4 means are provided for relieving the force of these springs during certain stages of operation. In other arrangements it is possible to eliminate the springs altogether whereby the valve intended to be opened will simply open under the force of the fluid flowing to vent while the other outer valve disc will be positively closed.

The above described modifications and other modifications will now be more specifically described with respect to the embodiments of FIGS. 7 through 10. It will be understood that many of the modifications shown in FIGS. 7 through 10 are equally adaptable for use with the previously described embodiments of the valve as shown for example in FIGS. 3 and 4.

Figure 7:
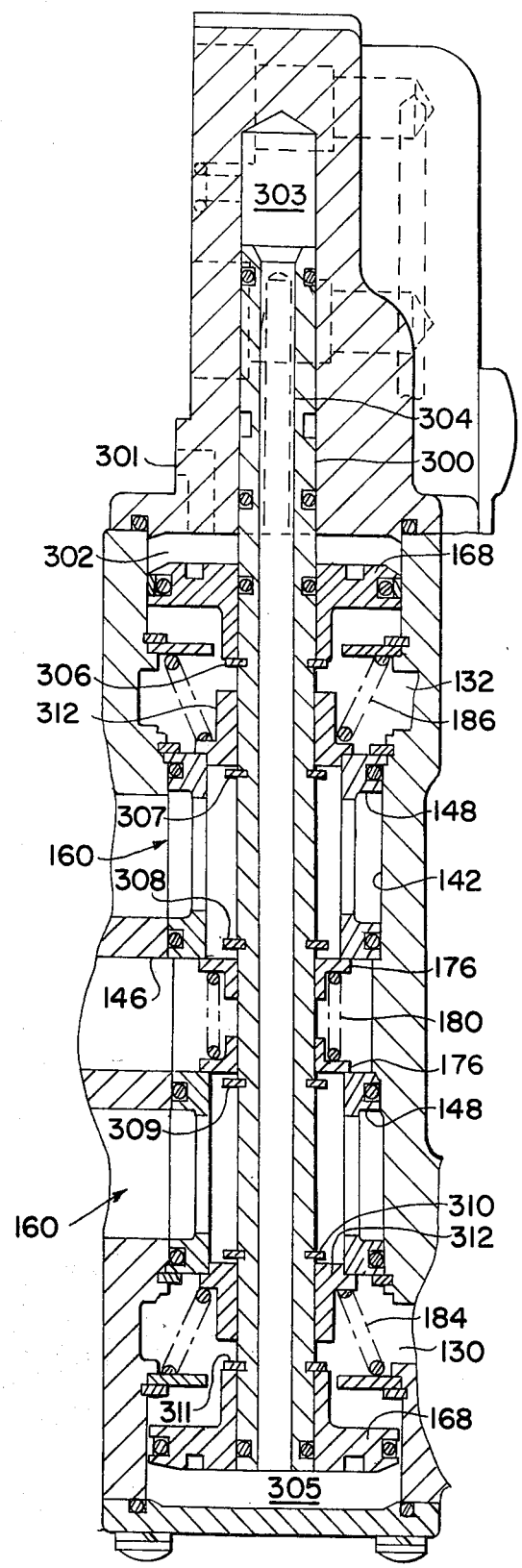
FIG. 7 is a central longitudinal sectional view through a valve showing another embodiment of the invention.

FIG. 7 illustrates a further embodiment of the present invention. It will be understood that many features of FIG. 7 are identical or essentially similar to elements as described with respect to FIGS. 3 and 4, and for this purpose like numerals have been employed. In FIG. 7 there is provided a hollow elongated member 300. A fluid line 301 delivers fluid to the space 302 above the upper piston 168. Fluid is delivered to the space beneath the lower piston 168 via a passageway leading to opening 303 (at the top of FIG. 7) and then through the opening 304 in the center of elongated member 300 and finally to the space 305. Since the reaction surface against the bottom of lower piston 168 is much greater than the reaction surface against the top of elongated member 300, fluid delivered through this fluid path will have the resultant effect of urging the lower piston 168 upwardly. The member 300 is provided with a number of strategically located circlips 306 through 311. The outer discs 312 are shaped somewhat differently than the discs of FIGS. 3 and 4 in that they include a boss portion extending beyond the actual valve seat into the aperture formed by the valve seat. The embodiment of FIG. 7 thus includes a number of modifications which have simplified the structure of the valve. For example, the circlips 306 through 311 are more economical than the sleeves provided in FIGS. 3 and 4 for operating upon the valve discs. It is advantageous to provide the fluid flow at a single end of the valve rather than at both ends.

The embodiment of FIG. 7 operates in essentially the same manner as FIG. 3 except for certain apparent differences. For example, in this case when the elongated member 300 moves axially, for example upwardly to open the lower inner valve disc 176, it will also act via an appropriately located circlip, for example 307 in the case illustrated, to open the opposite valve discs 312 in opposition to spring 186. The embodiment of FIG. 7 has been found to be particularly suitable for use in a torque converter of the releasable turbine type.

Figure 8:
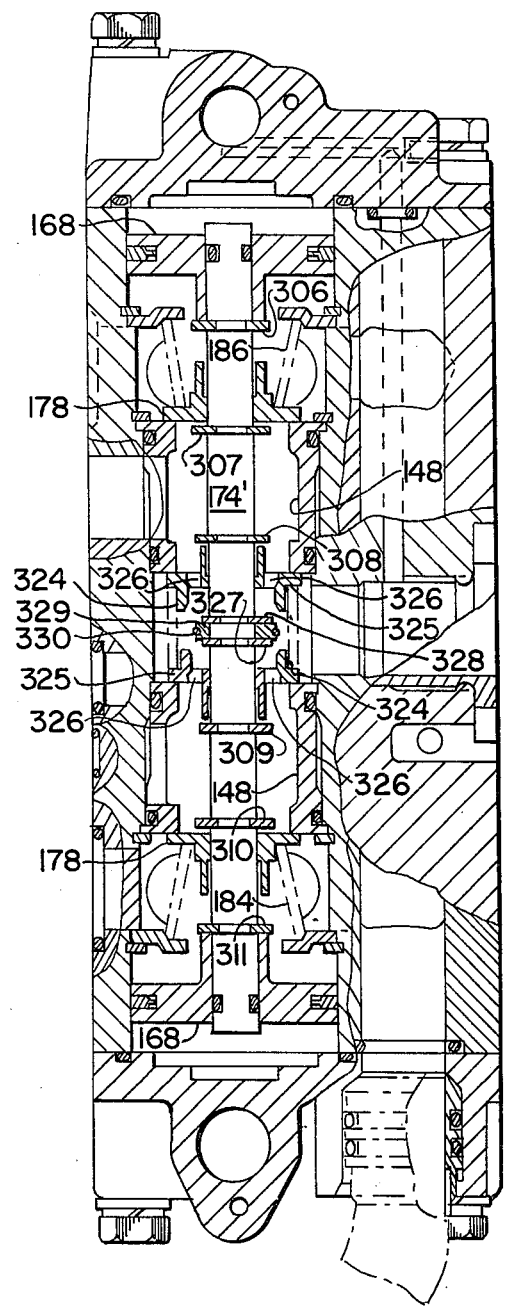
FIG. 8 is a central longitudinal view through a valve showing still another embodiment of the present invention.

FIG. 8 shows another embodiment of the present invention. This embodiment utilizes a solid elongated member like that of FIG. 3 in combination with a set of circlips 306 through 311 of the type shown in FIG. 7. This embodiment is particularly suitable for use with a one and one-half stage releasable turbine type torque converter.

Referring to FIG. 8, this embodiment is characterized by a pair of inner valve discs 325 which include openings 326 therethrough. In a manner and for a purpose to be described below, the elongated member 174' includes a pair of retaining means such as circlips 327 and 328 centrally thereon, these circlips retaining a circular bushing 329 on which is mounted a suitable O-ring 330. As will be evident in the following discussion, when the assembly including elements 327 through 330 moves into the area defined by the raised ridge 324 of a valve disc 325, it will cooperate therewith to close-off the openings 326 of that valve disc.

As mentioned above, the embodiment of FIG. 8 is particularly suitable for use with a releasable turbine type torque converter. In using the embodiment of FIG. 8, with the valve in the position as shown in that figure, fluid passes through the openings 326 in both valve discs 325 and hence into both of the respective control ports, and this keeps the radial extension of the turbine shaft (i.e. the element against which the fluid forces act to cause connection or release of the turbine member) free from engagement with either the rotating casing (direct drive) or the pump part (hydraulic drive). That is, fluid through both of these sets of openings 326 tends to maintain the releasable turbine member in the released, neutral position. Direct and hydraulic drive are then brought about by moving the elongated member 174' in one direction for one mode of operation and in the other direction for the other mode of operation. For example, to move the member 174' upwardly, pressurized fluid is delivered beneath the lower piston 168, whereby this piston member acts upon circlip 311, moving the member 174' and the remaining circlips 307 through 310 upwardly. Circlip 309 then opens the lowermost of the two inner valve discs 325 to permit pressurized fluid to pass thereby and therebeneath. In the meantime, upon upward movement of member 174', the arrangement including elements 327 through 330 move upwardly to block the openings 326 in the upper still closed valve disc 325. At the same time, in this embodiment the upper circlip 307 moves upwardly to positively open the upper outer valve disc 178. At the same time, as with the previous embodiments, the other outer valve disc, i.e. the lower valve disc 178 in FIG. 8 is positively closed by means acting in addition to the spring 186, namely the force of the circlip 311 which acts thereon.

Figure 9:
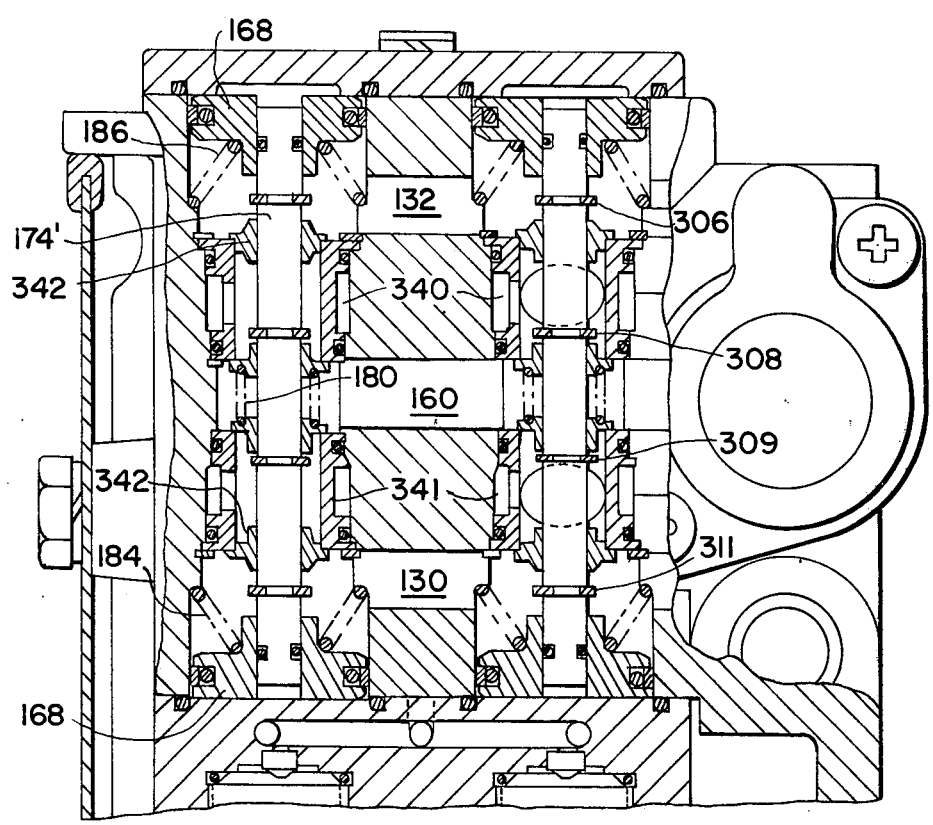
FIG. 9 is a central longitudinal sectional view through a system including a pair of valves, each constructed in accordance with the present invention, and which valves cooperate with each other in a single system.
Figure 10:
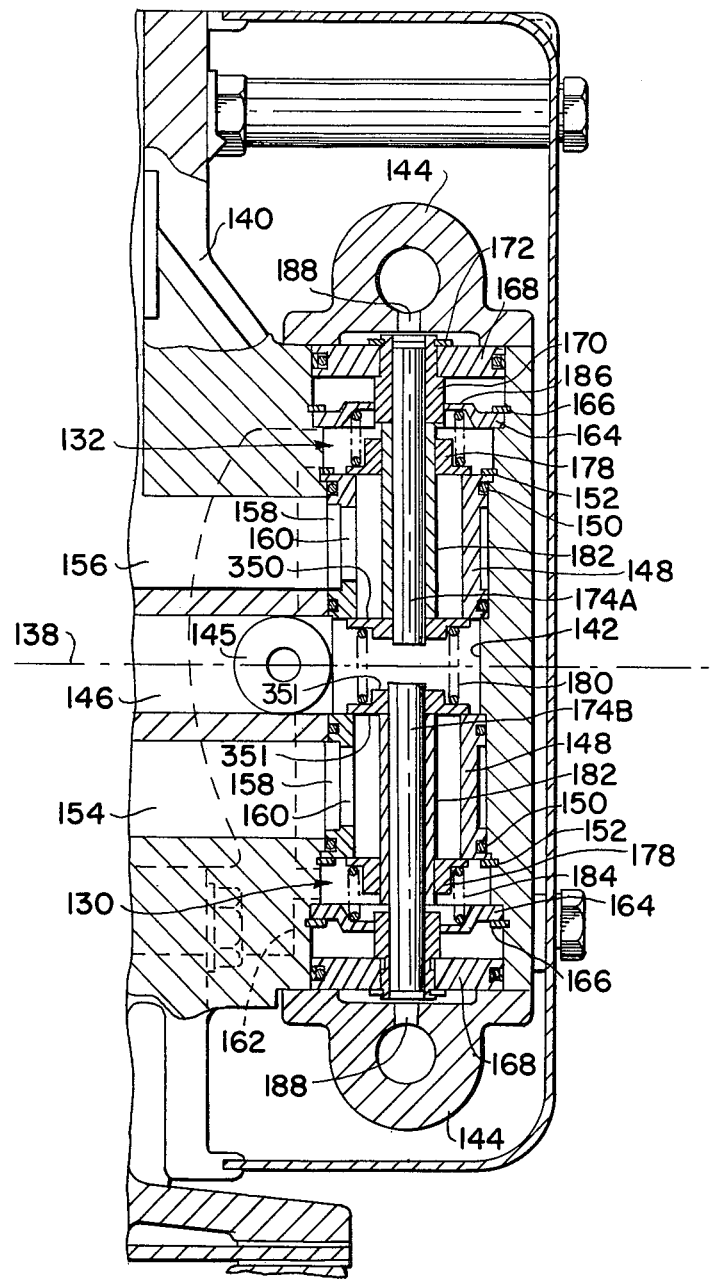
FIG. 10 is a central longitudinal cross-sectional view through a valve showing another embodiment of the present invention.

FIGS. 9 and 10 illustrate arrangements utilizing the valve structure of the present invention wherein the valve structures are arranged so as to act as a pair of 3-way valves rather than as a 5-way valve. Referring to FIG. 9, there is shown a pair of parallel valves each quite similar to the valves described above (such as the valve of FIG. 8, but omitting elements 326 through 330). In this embodiment, the two valves act in parallel, both of the valves being connected to a common central pressurized inlet passage 160 and a pair of common vent passages 130 and 132. In this case one of the control ports 340 is connected to one of the brakes 12 or 14 while the other control passage 341 is connected to the other of the brakes 312 or 314. Hence, the arrangement of FIG. 9 is adapted for controlling these brakes so that they could serve as the valve 200 of FIG. 5. It will be noted that the upper and lower vent valves 342 do not include any spring means whatsoever. They do include circlips 306 and 311 for positively closing that outer valve disc 342 intended to be closed. However, as for the valve disc 342 intended to be opened, there is provided no spring means to close it and no means to positively open it. Incidently, while two such valves are shown in FIG. 9, they operate in parallel and one valve might be provided on either side of the symmetry line of the oil feeding system. An advantage of the arrangement of FIG. 9 is that in operating brakes 12 and 14, it is necessary that one brake be completely disconnected before the other brake is connected. With the arrangement of FIG. 9, when the elongated member 174' moves from one position to the opposite position, there is a point in time during which both of the valves 342 are open to connect both of the passageways 340 and 341 to vent at the same time. This assures that there is a point in time during which both of the brakes 12 and 14 are connected to neutral before one of the brakes is operated.

FIG. 10 illustrates still another modification of the present invention. This embodiment is similar to FIG. 3 except that the elongated member has been replaced by a pair of separate, independent elongated members 174A and 174B which operate independently of each other. Consequently, both sides of the valve can be operated concurrently. In this manner, the arrangement of FIG. 10, like that of FIG. 9, operates as a pair of 3-way valves rather than as a single 5-way valve.

Another advantage of a valve constructed in accordance with the present invention wherein all of the valve elements are disc type elements is that these elements may be constructed out of metal as opposed to rubber or other synthetic materials, as a result of which the elements of the valve can withstand much greater pressure and much higher temperatures than would be the case with a valve using rubber or other synthetic valve elements.

Although the invention has been described in considerable detail with respect to preferred embodiments thereof, it will be apparent that the invention is capable of numerous modifications and variations apparent to those skilled in the art without departing from the spirit and scope of the invention, as defined in the claims.

I claim:

1. A torque converter having a working chamber with at least a pump part and a turbine part, said pump part having at least one ring of pump blades and said turbine part having at least one ring of turbine blades,
    a fluid communication system within the torque converter for controlling its mode of operation,
    a valve device for controlling the flow of fluid in said fluid communication system,
    said valve device comprising,
    an elongated bore,
    at least five ports opening into said bore including a high pressure port, a pair of control ports in communication with the fluid communication system of the torque converter and located, longitudinally, one on each side of said high pressure port, and a pair of low pressure ports located, longitudinally, one beyond each control port on the side thereof opposite from said high pressure port,
    a first pair of abutment means located, longitudinally, one between the high pressure port and each of the control ports, and a second pair of abutment means located, longitudinally, one between each control port and its adjacent low pressure port, each of the abutment means including surfaces located in a radial plane constituting means for defining a valve seat for a disc valve element adapted to move axially thereagainst,
    elongated means located within the bore and movable axially therein,
    a first pair of valve discs mounted on said elongated means, one between the high pressure port and each of said control ports and arranged to cooperate with the valve seat of the corresponding one of the first pair of abutment means and openable away from its valve seat towards the high pressure port,
    a second pair of valve discs mounted on the elongated means, one between each control port and its adjacent low pressure port and arranged to cooperate with the valve seat of the corresponding one of the second pair of abutment means in a direction from its respective low pressure port towards its respective control port such that it is openable towards its respective low pressure port,
    and means operatively associated with the elongated means for selectively opening said valve discs upon axial movement of the elongated means.

2. A torque converter according to claim 1, said elongated means comprising a single elongated member and said valve discs being mounted thereon.

3. A torque converter according to claim 2, including a piston at each end of the elongated member and means for delivering pressurized fluid to each of said pistons for moving the cylinder in one direction or the other, respectively.

4. A torque converter according to claim 3, including a first passageway at one end of the valve device for operating the piston at that end, and a second passageway at the same end of the valve device as the first said passageway for delivering pressurized fluid to an opening passing completely through the elongated member for delivering fluid to act upon the other piston at the other end of the valve device.

5. A torque converter according to claim 1, said means for selectively opening the valve discs comprising projections attached to and movable with the elongated means and positioned to engage selected valve discs to move the same upon movement of the elongated member.

6. A torque converter according to claim 1, said means for selectively opening the valve discs comprising sleeve members mounted on the elonated means and movable therealong to engage selected valve discs to move the same upon movement of the elongated means.

7. A torque converter according to claim 1, including resilient means for urging against their seats each of the valve discs of the first pair, whereby they function as maximum pressure valves.

8. A torque converter according to claim 1, including resilient means for urging against their seats each of said valve discs of the second pair, whereby they function as maximum pressure valves.

9. A torque according to claim 1, wherein the valve seats are formed on the ends of cylindrical spacing members which form the said abutment means.

10. A torque converter according to claim 1, including a piston at each end of the elongated means, and means for delivering pressurized fluid to each of said pistons for moving the elongated means in one direction or the other, and wherein the pistons are arranged coaxially with respect to the valve seats and the valve discs.

11. A torque converter according to claim 1, including a piston at each end of the elongated means, and including means for delivering pressurized fluid to each of said pistons for moving the elongated means in one direction or the other, and including electrohydraulic valves for controlling the flow of fluid to said pistons.

12. A torque converter according to claim 1, one of said pump part or turbine part being releasable from the member which it drivingly engages during hydraulic drive of the torque converter.

13. A torque converter according to claim 12, said torque converter having a first of said valve devices for controlling the releasability of the said releasable part, at least one guide part having a ring of guide blades, a guide part brake, a holding clutch for a planet gear carrier between the guide part and a turbine shaft associated with the turbine part, and a reverse gear, including a first brake for direct drive through the reverse gear and a second brake for a planet carrier for reverse drive through the reverse gear, wherein fluid for actuating all of said brakes is drawn from the outflow of a feeder fluid pump through at least one valve device separate from the valve device of the releasable torque converter part, and including a restriction means actuated by a servo motor in a connection between the feeder fluid pump and the valve device associated with the releasable torque converter part, whereby the pressure fluid for the brakes is maintained higher than the pressure of the fluid passing through the torque converter when said restriction is actuated.

14. A torque converter according to claim 13, wherein the restriction is always active when the guide part brake is engaged.

15. A torque converter according to claim 1, one of said pump or turbine part being releasable from the member which it drivingly engages during hydraulic drive of the torque converter, and the input to the torque converter being engagable with the turbine part in another position for direct drive, said valve device being movable to one position with one of its first pair of valve discs open and the valve disc of the second pair on the opposite side open to provide fluid flow for hydraulic drive, and said valve device being movable to another position with the other of the first pair of valve discs and the other of the second pair of discs open to provide fluid flow for direct drive.

16. A torque converter according to claim 1, wherein the elongated means, when opening one of the first pair of valve discs includes means for positively closing the valve disc of the second pair on the same side of the high pressure port.

17. A torque converter according to claim 16, wherein simultaneously with the opening of a valve disc of the first pair on one side of the high pressure port, the valve disc of the second pair on the opposite side of the high pressure port is open so as to reduce the pressure drop thereacross.

18. A torque converter according to claim 16, said second pair of valve discs being free of resilient means tending to close them except for said means which acts positively upon them upon opening of the valve disc of the first pair of valve discs on the same side of the high pressure port.

19. A torque converter according to claim 16, including resilient means for urging against their seats each of said valve discs of the second pair, whereby they function as maximum pressure valves, and including means for positively lifting each of said second pair of valve discs off of their respective seats during opening of the valve disc of the first pair of valve discs on the opposite side of the high pressure port.

20. A torque converter according to claim 1, including openings in the first pair of valve discs and said elongated means being a single elongated member and including a sealing assembly thereon between the two valve discs of the first pair and positioned to close the openings in one of the discs of the first pair of valve discs when the elongated member is moved to open the other of said first pair of valve discs.

21. A torque converter according to claim 20, said sealing assembly comprising an O-ring on the elongated member and retaining means to retain the O-ring in place thereon.

22. A torque converter according to claim 1, said valve device comprising a pair of separate elongated bores, each bore having therein an elongated means with said valve discs and said valve seats and said ports, corresponding ports from each of the two bores being in communication with each other.

23. A torque converter according to claim 1, said elongated means comprising a pair of axially aligned elongated members, each including thereon valve discs for one of the first pair of valve discs and for one of the second pair of valve discs on the same side of the high pressure port, whereby the two elongated members are operable independently of each other.

24. A torque converter according to claim 23, including resilient means for urging against their seats each of said valve discs of the first pair, whereby they function as maximum pressure valves.

25. A torque converter according to claim 1, said torque converter having a guide part and a ring of guide blades thereon, first brake means for holding the guide part stationary and second brake means for causing the guide part to rotate oppositely from the turbine part, and including a said valve device for controlling the flow of fluid to said brakes.

26. A torque converter according to claim 1, including a reverse gear operatively connected to the turbine part downstream from the torque converter, brake means for controlling the mode of operation of the reverse gear, and including a said valve device for controlling the flow of fluid to said reverse gear brake means.

27. A valve device comprising,
an elongated bore,
at least five ports opening into said bore including a high pressure port, a pair of control ports located, longitudinally, one on each side of said high pressure port, and a pair of low pressure ports located, longitudinally, one beyond each control port on the side thereof opposite from said high pressure port,
a first pair of abutment means located, longitudinally, one between the high pressure port and each of the control ports, and a second pair of abutment means located, longitudinally, one between each control port and its adjacent low pressure port, each of the abutment means including surfaces located in a radial plane constituting means for defining a valve seat for a disc valve element adapted to move axially thereagainst,
elongated means located within the bore and movable axially therein,
a first pair of valve discs mounted on said elongated means, one between the high pressure port and each of said control ports and arranged to cooperate with the valve seat of the corresponding one of the first pair of abutment means and openable away from its valve seat towards the high pressure port,
a second pair of valve discs mounted on the elongated means, one between each control port and its adjacent low pressure port and arranged to cooperate with the valve seat of the corresponding one of the second pair of abutment means in a direction from its respective low pressure port towards its respective control port such that it is openable towards its respective low pressure port,
and means operatively associated with the elongated means for selectively opening said valve discs upon axial movement of the elongated means.

28. A valve device according to claim 27, said elongated means comprising a single elongated member and said valve discs being mounted thereon.

29. A valve device according to claim 28, including a piston at each end of the elongated member and means for delivering pressurized fluid to each of said pistons for moving the cylinder in one direction or the other, respectively.

30. A valve device according to claim 29, including a first passageway at one end of the valve device for operating the piston at the end, and a second passageway at the same end of the valve device as the first said passageway for delivering pressurized fluid to an opening passing completely through the elongated member for delivering fluid to act upon the other piston at the other end of the valve device.

31. A valve device according to claim 27, said means for selectively opening the valve discs comprising projections attached to and movable with the elongated means and positioned to engage selected valve discs to move the same upon movement of the elongated member.

32. A valve device according to claim 27, said means for selectively opening the valve discs comprising sleeve members mounted on the elongated means and movable therealong to engage selected valve discs to move the same upon movement of the elongated means.

33. A valve device according to claim 27, including resilient means for urging against their seats each of the valve discs of the first pair, whereby they function as maximum pressure valves.

34. A valve device according to claim 27, including resilient means for urging against their seats each of said valve discs of the second pair, whereby they function as maximum pressure valves.

35. A valve device according to claim 27, wherein the valve seats are formed on the ends of cylindrical spacing members which form the said abutment means.

36. A valve device according to claim 27, including a piston at each end of the elongated means, and means for delivering pressurized fluid to each of said pistons for moving the elongated means in one direction or the other, and wherein the pistons are arranged co-axially with respect to the valve seats and the valve discs.

37. A valve device according to claim 27, including a piston at each end of the elongated means, and including means for delivering pressurized fluid to each of said pistons for moving the elongated means in one direction or the other, and including electrohydraulic valves for controlling the flow of fluid to said pistons.

38. A valve device according to claim 27, wherein the elongated means, when opening one of the first pair of valve discs includes means for positively closing the valve disc of the second pair on the same side of the high pressure port.

39. A valve device according to claim 38, wherein simultaneously with the opening of a valve disc of the first pair on one side of the high pressure port, the valve disc of the second pair on the opposite side of the high pressure port is open so as to reduce the pressure drop thereacross.

40. A valve device according to claim 38, said second pair of valve discs being free of resilient means tending to close them except for said means which acts positively upon them upon opening of the valve disc of the first pair of valve discs on the same side of the high pressure port.

41. A valve device according to claim 38, including resilient means for urging against their seats each of said valve discs of the second pair, whereby they function as maximum pressure valves, and including means for positively lifting each of said second pair of valve discs off of their respective seats during opening of the valve disc of the first pair of valve discs on the opposite side of the high pressure port.

42. A valve device according to claim 27, including openings in the first pair of valve discs and said elongated means being a single elongated member and including a sealing assembly thereon between the two valve discs of the first pair and positioned to close the openings in one of the discs of the first pair of valve discs when the elongated member is moved to open the other of said first pair of valve discs.

43. A valve device according to claim 42, said sealing assembly comprising an O-ring on the elongated member and retaining means to retain the O-ring in place thereon.

44. A valve device according to claim 27, said valve device comprising a pair of separate elongated bores, each bore having therein an elongated means with said valve discs and said valve seats and said ports, corresponding ports from each of the two bores being in communication with each other.

45. A valve device according to claim 27, said elongated means comprising a pair of axially aligned elongated members, each including thereon valve discs for one of the first pair of valve discs and for one of the second pair of valve discs on the same side of the high pressure port, whereby the two elongated members are operable independently of each other.

46. A valve device according to claim 45, including resilient means for urging against their seats each of said valve discs of the first pair, whereby they function as maximum pressure valves.

* * * * *